(12) United States Patent
Watley et al.

(10) Patent No.: US 6,381,385 B1
(45) Date of Patent: Apr. 30, 2002

(54) POLARIZATION MODE DISPERSION EMULATION

(75) Inventors: Daniel A Watley, Cambridge; Richard Epworth, Sawbridgeworth; Alan Robinson, Harlow, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/470,628

(22) Filed: Dec. 22, 1999

(51) Int. Cl.[7] ................................................ G02B 6/00
(52) U.S. Cl. .......................... 385/28; 385/11; 385/123; 359/161; 359/156
(58) Field of Search ............................ 385/11, 29, 123, 385/95, 99, 28; 359/156, 161, 192

(56) References Cited

U.S. PATENT DOCUMENTS 5,965,874 A * 10/1999 Aso et al. .................... 250/225
,024,538 A1 * 9/2001 Khorsravani et al. ......... 385/11

OTHER PUBLICATIONS

C H Prola, Jr. et al. in, 'PMD Emulators and Signal Distortion in 2.48 Gb/s UM–DD Lightwave Systems', IEEE Phot. Tech. Lett., vol. 9, No. 6, (Jun. 1997).

B. L. Heffner, "Automated Measurement of Polarization Mode Dispersion Using Jones Matrix Eigenanalysis", IEEE Phot. Tech. Lett., vol. 4, No. 9, pp 1066–1069, (Sep. 1992).

G. J. Foschini & C. D. Poole, "Statistical Theory of Polarization Dispersion in Single–Mode Fibers", J. Lightwave Tech., vol. 9, No. 11, pp 1439–1456, (Nov. 1991).

J M Gleeson et al., 'Experimentl and numerical investigation into the penalties induced by second order polarisation mode dispersion at 10Gb/s', Conference Proceedings, ECOC '97, 1997, Edinburgh, pp15–18.

* cited by examiner

*Primary Examiner*—Darren Schuberg
*Assistant Examiner*—Fayez Assaf
(74) *Attorney, Agent, or Firm*—Lee, Mann, Smith, McWilliams, Sweeney & Ohlson (57) ABSTRACT

A PMD (polarisation mode dispersion) emulator which provides at least first and second order emulation of PMD effects observed in fiber installed in the field consists of a small number of concatenated lengths of high birefringence fiber having an appropriate distribution of relative DGDs (differential group delays), and connected with random relative orientation. Varying some parameter, such as temperature distribution, allows the emulator to provide accelerated exploration of random fluctuations in PMD which, in the field, may require many weeks, or longer, to observe.

26 Claims, 7 Drawing Sheets

| Emulator | | A | B | C | D | E | F | G | H |
|---|---|---|---|---|---|---|---|---|---|
| Design Criteria | No of sections | 8 | 12 | 8 | 14 | 14 | 8 | 14 | 20 |
| | $\tau_{range}/\langle DGD_{RMS}\rangle$ | 0.27 | 0.34 | 0.39 | 0.41 | 0.87 | 0.11 | 0.08 | 0 |
| | $\tau_{min}$ | 0.22 | 0.13 | 0.07 | 0.03 | 0 | 0.29 | 0.23 | 0.22 |
| | $\langle\tau\rangle/\langle DGD_{RMS}\rangle$ | 0.342 | 0.27 | 0.32 | 0.24 | 0.12 | 0.35 | 0.26 | 0.22 |
| | $\sigma_\tau/\langle DGD_{RMS}\rangle$ | 0.096 | 0.11 | 0.17 | 0.13 | 0.25 | 0.04 | 0.02 | 0 |
| | (i) | Yes | Yes | Yes | Yes | Yes | Yes | Yes | Yes |
| | (ii) | Yes | Yes | Yes | No | No | No | No | No |
| | (iii) | Yes | Yes | No | Yes | Yes | No | No | No |
| | (iv) | No | Yes | No | Yes | Yes | No | Yes | Yes |
| | (v) | Yes | Yes | Yes | Yes | No | Yes | Yes | Yes |
| Test Criteria | $\sigma/\mu$ | 0.392 | 0.41 | 0.41 | 0.43 | 0.27 | 0.43 | 0.43 | 0.45 |
| | $\gamma_1$ | 0.448 | 0.45 | 0.39 | 0.43 | -0.2 | 0.53 | 0.56 | 0.57 |
| | $R^2$ | 111 | 65 | 57 | 84 | 1730 | 95 | 64 | 230 |
| | $\langle PSP'\rangle/\mu^{PSP'}$ | 0.187 | 0.185 | 0.17 | 0.19 | 0.13 | 0.17 | 0.19 | 0.18 |
| | $\gamma_1^{PSP'}$ | 1.8 | 2.22 | 1.86 | 2.3 | 0.34 | 2.4 | 2.33 | 2 |
| | 1 | No | Yes | Yes | Yes | No | Yes | Yes | No |
| | 2 | Yes | Yes | No | Yes | No | Yes | Yes | Yes |
| | 3 | No | Yes | Yes | Yes | No | No | Yes | No |
| | 4 | Yes | Yes | No | Yes | No | No | Yes | Yes |
| | 5 | Yes | Yes | Yes | No | No | No | No | Yes |

POLARIZATION MODE DISPERSION EMULATION

FIELD OF THE INVENTION

This invention relates to the emulation of the polarisation mode dispersion (PMD) that is found to occur in single mode optical waveguide transmission systems. PMD is a dispersion which is limiting the performance of high bit rate transmission systems. All currently installed single mode transmission optical fibre is found to exhibit at least some measure of birefringence resulting from departures from perfect circular symmetry occasioned in the course of manufacture or by the subsequent application of non-circularly-symmetric stress fields. Such a departure from perfect circular symmetry introduces birefringence, thereby removing mode degeneracy and introducing PMD.

BACKGROUND TO THE INVENTION

The presence of PMD in a long length of installed transmission fibre produces differential group delay (DGD) in the propagation of light along that fibre. The magnitude of this DGD varies significantly over both time and wavelength. When designing a high speed optical transmission system the impact of PMD, in terms of the DGD that it engenders, needs to be quantified by considering the worst case situation, largest magnitude DGD, likely to occur within the lifetime of the system. This worst case situation is a very low probability event, and so the system designer will generally have to rely upon estimating its DGD, rather than actually measuring it. Estimation requires a model of the behaviour of a typical length of installed fibre. In this context, it may be observed that the behaviour of a reel of fibre in the laboratory does not, and can not be expected to, resemble that of fibre installed in the field.

It is widely accepted that the wavelength dependence properties of the PMD of a long length of installed transmission fibre can be modelled as a concatenation of randomly oriented birefringent elements of different birefringence magnitude. In order to get a realistic representation of the wavelength dependence of the fibre's behaviour, a very large number of birefringence elements is usually modelled. For a physical emulation, the birefringence elements may at least in principle be constituted by different lengths of birefringent fibre in which birefringence has been deliberately built in, hereinafter referred to as high birefringence fibre. An example of such an emulator is for instance described by C H Prola, Jr. et al. in, 'PMD Emulators and Signal Distortion in 2.48 Gb/s UM-DD Lightwave Systems'. In this particular emulator, the individual lengths of high birefringence fibre are concatenated by splicing them together with random (but fixed) relative orientations of birefringence axes at each splice. In this paper it is particularly stated that 'a great number of splices' is required 'to insure a random-mode coupling and a continuous distribution of polarization time-of-flights'. This has adverse cost and convenience implications. It would be desirable, other things being equal, to minimise the number of such lengths required to achieve a given level of emulation accuracy. For this, the appropriate choice of relative lengths of high birefringence fibre is likely to be critical. It may then be desirable to provide some mechanism by which the emulator can be caused to accelerate the time exploration of its PMD so as to mimic in minutes, or perhaps a few hours, the PMD behaviour which the real installed fibre may take years to explore.

SUMMARY OF THE INVENTION

An object of the present invention is to provide an emulator which closely mimics the PMD properties of an installed long length of fibre by means of a concatenation of a relatively small number of lengths of high birefringence fibre assembled with random relative orientation of their birefringence axes.

According to a first aspect of the present invention, there is provided a method of emulating the first and second order PMD (polarisation mode dispersion) properties of a length of low birefringence optical fibre installed in the field, in which method light is caused to propagate through a concatenation of n lengths of high birefringence optical waveguide, each having two guided modes, respectively a fast mode and a slow mode, and each length presenting a different value of differential group delay, $\tau_r$, for light propagating in those modes, where r is a positive integer between 1 and n, wherein the $r^{th}$ length of the concatenation is optically coupled with the $(r+1)^{th}$ length in a manner providing cross coupling of the modes so that only $\cos^2 \theta_r$ of the power propagating in each mode (fast or slow) of the $r^{th}$ length is launched into the same mode (fast or slow) of the $(r+1)^{th}$ length while the remaining $\sin^2 \theta_r$ of the power is launched into the opposite mode (slow or fast), wherein the values of $\theta_r$ for r=1 to r=(n−1) have a substantially random distribution within the range 0 to $\pi/2$, and wherein said lengths and their differential group delays satisfy the following five criteria (i) to (v):

$$5 \leq n \leq 30 \quad (i)$$

$$0.2 \leq \frac{\tau_{range}}{\langle DGD_{RMS} \rangle} \leq 0.4 \quad (ii)$$

$$\tau_{min} < \tau_{range} \quad (iii)$$

$$\frac{\bar{\tau}}{\langle DGD_{RMS} \rangle} \leq 0.3 \quad (iv)$$

and $$\sigma_\tau < \bar{\tau} \quad (v)$$

where the expected root mean square DGD (differential group delay) of the concatenation is $$\sqrt{\sum_{r=1}^{r=n} \tau_r^2} = \langle DGD_{RMS} \rangle,$$

the mean DGD of the lengths is $$\frac{\sum_{r=1}^{r=n} \tau_r}{n} = \bar{\tau},$$

the DGD values of the lengths respectively with the maximum and minimum DGDs are $\tau_{max}$ and $\tau_{min}$, the range of DGD values is $\tau_{range} = \tau_{max} - \tau_{min}$, and the standard deviation of the DGD values is $\sigma_\tau$.

According to a second aspect of the present invention, there is provided a method of emulating the first and second order PMD (polarisation mode dispersion) properties of a length of low birefringence optical fibre installed in the field, in which method light is caused to propagate through a concatenation of n lengths of high birefringence optical waveguide, wherein $5 \leq n \leq 30$, each having two guided modes, respectively a fast mode and a slow mode, and each presenting a different value of differential group delay, $\tau$, for light propagating in those two modes, wherein the $r^{th}$ length of the concatenation, where r is a positive integer between 1 and n, is optically coupled with the $(r+1)^{th}$ length in a manner providing cross coupling of the modes so that only $\cos^2 \theta_r$ of the power propagating in each mode (fast or slow) of the $r^{th}$ length is launched into the same mode (fast or slow) of the $(r+1)^{th}$ length while the remaining $\sin^2 \theta_r$ of the power is launched into the opposite mode (slow or fast), wherein the values $\theta_r$ for r=1 to r=(n−1) have a substantially random distribution within the range 0 to $\pi/2$, wherein said differential group delay values are substantially aligned with members of the series $\tau=q^s$, where q is a constant common to all members of the series, and s is a different integer for each member of the series.

According to a third aspect of the present invention, there is provided a method of emulating the first and second order PMD (polarisation mode dispersion) properties of a length of low birefringence optical fibre installed in the field, in which method light is caused to propagate through a concatenation of n lengths of high birefringence fibre, each presenting a different value of differential group delay, $\tau_r$, where r is a positive integer between 1 and n, and each connected with its adjacent lengths in the concatenation with birefringence axes unaligned relative orientation, wherein said lengths satisfy the following five criteria (i) to (v):

$$5 \leq n \leq 30 \qquad (i)$$

$$0.2 \leq \frac{\tau_{range}}{\langle DGD_{RMS} \rangle} \leq 0.4 \qquad (ii)$$

$$\tau_{min} < \tau_{range} \qquad (iii)$$

$$\frac{\bar{\tau}}{\langle DGD_{RMS} \rangle} \leq 0.3 \qquad (iv)$$

and $$\sigma_\tau < \bar{\tau} \qquad (v)$$

where the expected root mean square DGD (differential group delay) of the concatenation is $$\sqrt{\sum_{r=1}^{r=n} \tau_r^2} = \langle DGD_{RMS} \rangle,$$

the mean DGD of the lengths is $$\frac{\sum_{r=1}^{r=n} \tau_r}{n} = \bar{\tau},$$

the DGD values of the lengths respectively with the maximum and minimum DGDs are $\tau_{max}$ and $\tau_{min}$, the range of DGD values is $\tau_{range}=\tau_{max}-\tau_{min}$, and the standard deviation of the DGD values is $\sigma_\tau$.

According to a fourth aspect of the present invention, there is provided a method of emulating the first and second order PMD (polarisation mode dispersion) properties of a length of low birefringence optical fibre installed in the field, in which method light is caused to propagate through a concatenation of n lengths of high birefringence optical waveguide, wherein $5 \leq n \leq 30$, each presenting a different value of differential group delay, $\tau$, and each connected with its adjacent lengths in the concatenation with birefringence axes unaligned substantially random relative orientation, wherein said differential group delay values are substantially aligned with members of the series $\tau=q^s$, where q is a constant common to all members of the series, and s is a different integer for each member of the series.

According to a fifth aspect of the present invention, there is provided an emulator for emulating the first and second order PMD (polarisation mode dispersion) properties of a length of low birefringence optical fibre installed in the field, the emulator including a concatenation of n lengths of high birefringence optical waveguide through which light is caused to propagate, each length having two guided modes, respectively a fast mode and a slow mode, and each presenting a different value of differential group delay, $\tau_r$, for light propagating in those modes, where r is a positive integer between 1 and n, wherein the $r^{th}$ length of the concatenation is optically coupled with the $(r+1)^{th}$ length in a manner providing cross coupling of the modes so that only $\cos^2 \theta_r$ of the power propagating in each mode (fast or slow) of the $r^{th}$ length is launched into the same mode (fast or slow) of the $(r+1)^{th}$ length while the remaining $\sin^2 \theta_r$ of the power is launched into the opposite mode (slow or fast), wherein the values of $\theta_r$ for r=1 to r=(n−1) have a substantially random distribution within the range 0 to $\pi/2$, and wherein said lengths and their differential group delays satisfy the following five criteria (i) to (v):

$$5 \leq n \leq 30 \qquad (i)$$

$$0.2 \leq \frac{\tau_{range}}{\langle DGD_{RMS} \rangle} \leq 0.4 \qquad (ii)$$

$$\tau_{min} < \tau_{range} \qquad (iii)$$

$$\frac{\bar{\tau}}{\langle DGD_{RMS} \rangle} \leq 0.3 \qquad (iv)$$

and $$\sigma_\tau < \bar{\tau} \qquad (v)$$

where the expected root mean square DGD (differential group delay) of the concatenation is $$\sqrt{\sum_{r=1}^{r=n} \tau_r^2} = \langle DGD_{RMS} \rangle,$$

the mean DGD of the lengths is $$\frac{\sum_{r=1}^{r=n} \tau_r}{n} = \bar{\tau},$$

the DGD values of the lengths respectively with the maximum and minimum DGDs are $\tau_{max}$ and $\tau_{min}$, the range of DGD values is $\tau_{range}=\tau_{max}-\tau_{min}$, and the standard deviation of the DGD values is $\sigma_\tau$.

According to a sixth aspect of the present invention, there is provided an emulator for emulating the first and second order PMD (polarisation mode dispersion) properties of a length of low birefringence optical fibre installed in the field, the emulator including a concatenation of n lengths of high birefringence optical waveguide through which light is caused to propagate, wherein $5 \leq n \leq 30$, each having two guided modes, respectively a fast mode and a slow mode, and each presenting a different value of differential group delay, $\tau$, for light propagating in those two modes, wherein the $r^{th}$ length of the concatenation, where r is a positive integer between 1 and n, is optically coupled with the $(r+1)^{th}$ length in a manner providing cross coupling of the modes so that only $\cos^2 \theta_r$ of the power propagating in each mode (fast or slow) of the $r^{th}$ length is launched into the same mode (fast or slow) of the $(r+1)^{th}$ length while the remaining $\sin^2 \theta_r$ of the power is launched into the opposite mode (slow or fast), wherein the values of $\theta_r$ for r=1 to r=(n-1) have a substantially random distribution within the range 0 to $\pi/2$, wherein said differential group delay values are substantially aligned with members of the series $\tau=q^s$, where q is a constant common to all members of the series, and s is a different integer for each member of the series.

Preferably the emulator includes means that causes its PMD to vary with time at a much faster rate than would be typical of the fibre that it is emulating, so that in this way it will perform a PMD exploration in hours, or perhaps a few days, that the fibre itself would be liable to take years to explore.

Other features and advantages of the invention will be readily apparent from the following description of preferred embodiments of the invention, from the drawings and from the claims.

DETAILED DESCRIPTION OF PREFERRED EMBODIMENTS

Figure 1:
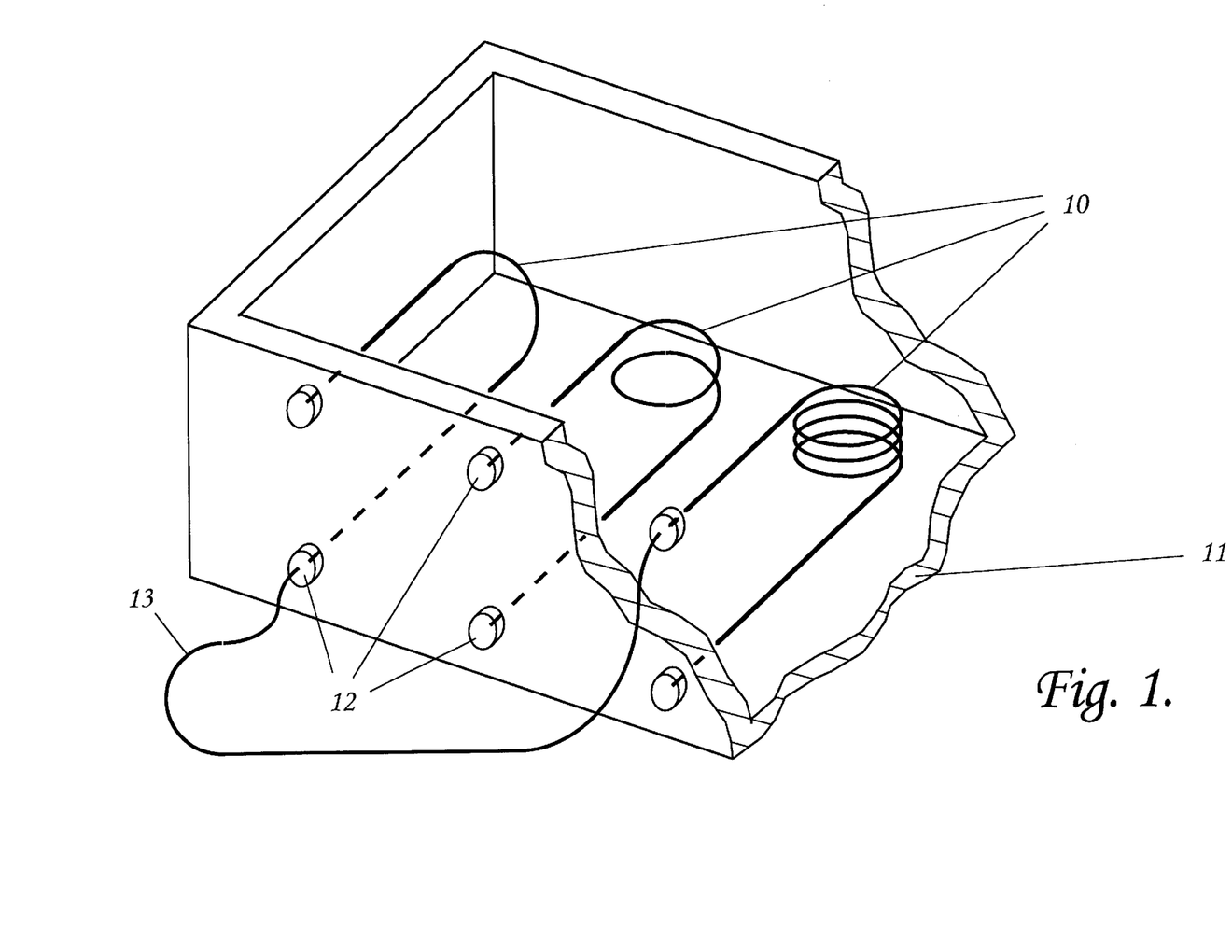
FIG. 1 is a part-sectioned schematic view of an emulator having splice connected lengths of high birefringence optical fibre.

Referring to FIG. 1, one preferred form of emulator has a set of lengths 10 of high birefringence fibre, each of a different length so as to provide that length with a unique value of DGD. These lengths of high birefringence fibre are contained in a housing 11 (lid not shown) and terminate in panel-mounted optical fibre connectors 12 arranged in one wall of the housing 11. A selection of these lengths 10 of high birefringence fibre are formed into a concatenation by means of patch cords 13 (only one illustrated) of low birefringence ordinary single mode (nominally) fibre. The number of lengths employed in any particular emulation, and the relationship between their DGDs will be discussed later in detail. One preferred DGD relationship is that the lengths have DGD values, $\tau$, that are substantially aligned with members of the series $\tau=q^s$, where q is a constant common to all members of the series, and s is a different integer for each member of the series. One particular advantage of the emulator of FIG. 1 is that it is particularly easy to reconfigure, for instance by altering the selection of its lengths 10 employed to form a particular concatenation, or altering the ordering of the members of a particular selection, or by altering the topology of individual patch-cords to change the inter-length polarisation state evolution introduced by changes in birefringence introduced by those topology changes.

Figure 2:
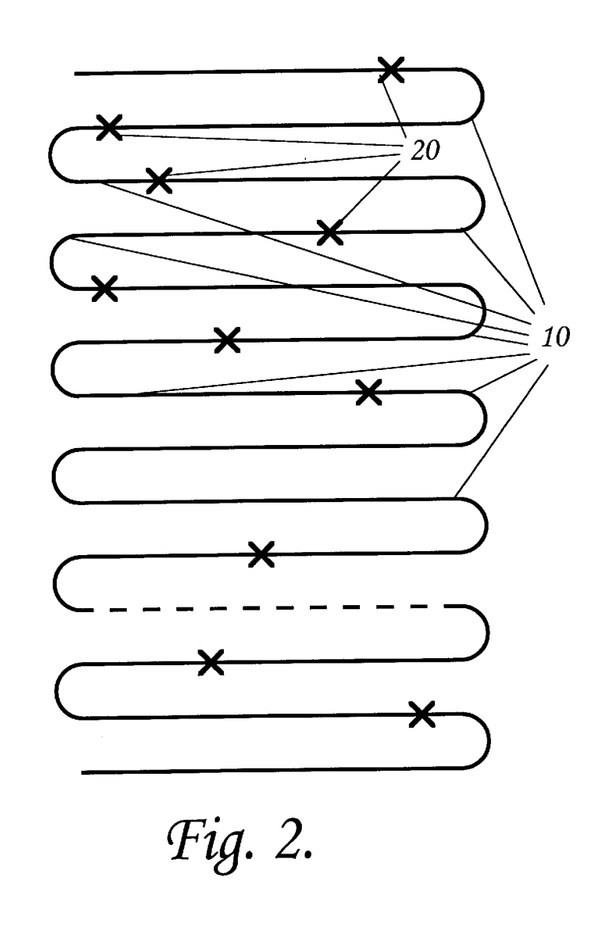
FIG. 2 is a schematic representation of an emulator having patch-cord connected lengths of high birefringence optical fibre.

In FIG. 2 there is schematically depicted an alternative form of emulator. In this emulator the individual lengths 10 of high birefringence fibre that go to make up the concatenation are directly spliced end-to-end. With splices indicated schematically at 20. In the making of each of these splices 20, a substantially random relative orientation is chosen between the birefringence axes at the two ends of fibre being spliced. In comparison with the emulator of FIG. 1, this emulator has the advantage of simplicity, but the disadvantage that, once created, it can not thereafter be adjusted, except by being taken physically apart.

Figure 3:
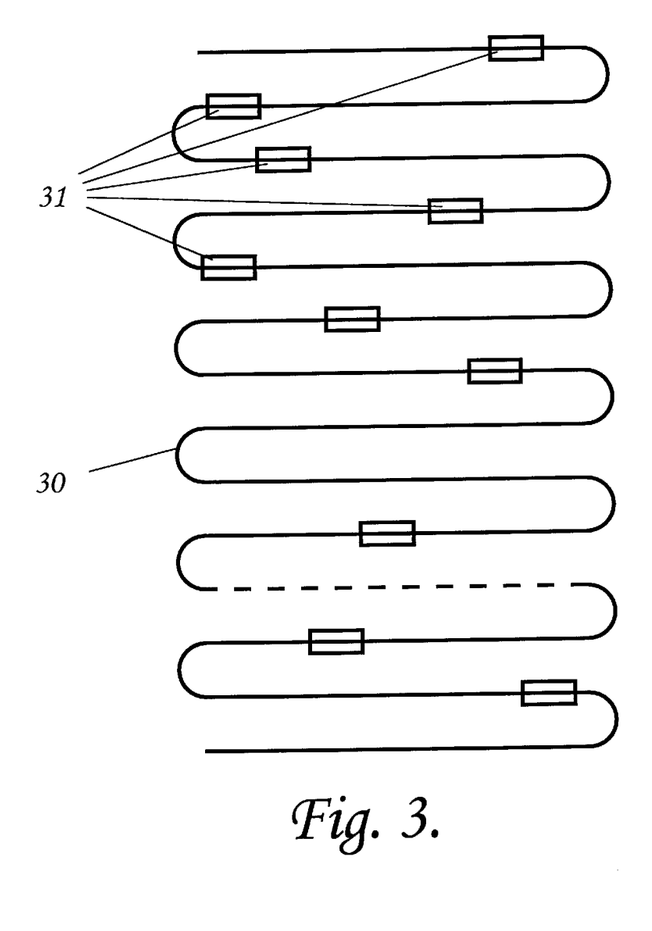
FIG. 3 is having a single piece of high birefringence optical fibre formed into the equivalent of a concatenation of randomly oriented lengths of fibre by a randomly spaced distribution of localised mode-coupling transducers.
Figure 4:
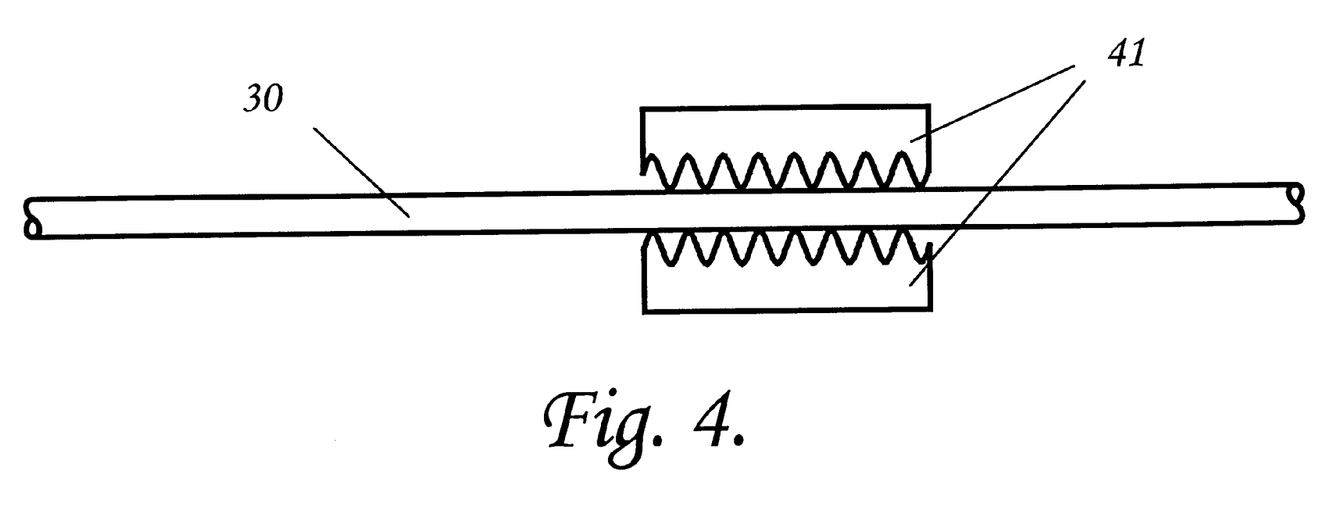
FIG. 4 is a schematic representation of a portion of the emulator of FIG. 3.

A third form of emulator is schematically depicted in FIG. 3. This emulator is distinguished from those of FIGS. 1 and 2 principally in that it is constructed from a single piece 30 of high birefringence fibre. In the case of the emulator of FIG. 2, if the birefringence axes of the $r^{th}$ length are inclined at its splice with the $(r+1)^{th}$ length at an angle $\theta_r$, then only $\cos^2 \theta_r$ of the power propagating in each mode (fast or slow) of the $r^{th}$ length is launched into the same mode (fast or slow) of the $(r+1)^{th}$ length, while the remaining $\sin^2 \theta_r$ of the power is launched into the opposite mode (slow or fast). In the emulator of FIG. 3 the same localised cross-coupling of fast and slow mode power is achieved in the continuous piece of high birefringence fibre by the use of localised polarisation modes coupling devices 31 located at intermediate distances along that fibre. These mode coupling devices may be constituted, as schematically depicted in FIG. 4, by a pair of anvils 41 positioned on opposite sides of the fibre 30, and urged together with variable strength. The mating faces of the anvils have mating transverse corrugations whose periodicity is matched with the polarisation mode beat length of the fibre 30. When the anvils of any particular mode coupling device 31 are far enough apart not to induce any corresponding bending of the fibre 30, there is no cross-coupling between the two polarisation modes of the fibre. As the anvils are urged closer, the increasing amount of bending produces increasing resonant coupling between the two modes of the fibre so that progressively more of the power originally propagating in the fast polarisation mode is coupled across at the coupling region into power propagating thereafter in the slow polarisation mode.

Since the birefringence of any length of high birefringence fibre is temperature sensitive, some evolution of the DGD presented by the emulators of FIGS. 1, 2 and 3 is observed just as the result of small naturally occurring temperature fluctuations at the laboratory bench. This means that the time exploration of the DGD of an emulator can be greatly accelerated by the use of heating elements, particularly when those heating elements produce changing temperature gradients along the optical path of the emulator. For this purpose one can use heating to provide randomly varying (chaotic) convection currents in a gaseous or liquid medium surrounding the high birefringence fibre. Alternatively, one can temperature control individual lengths by means of Joule heating of an electrically conductive coating on the fibre, or of a heating strip in thermal contact with the fibre. Equivalent effects can be induced in those lengths by straining them instead of heating them. Furthermore, in the case of an emulator in which the individual lengths of high birefringence fibre are concatenated by way of patch-cords, additional manipulation of the state of polarisation evolution between consecutive lengths of high birefringence fibre in the concatenation can be effected by including addressable liquid crystals or Faraday rotators in the patch-cord optical path.

For a proper understanding of the merits of the preferred embodiments, and the way in which their performance as emulators can be assessed, it is necessary to appreciate how DGD can be measured and how PMD may be evaluated from those DGD measurements.

As for instance described by B. L. Heffner, "Automated Measurement of Polarization Mode Dispersion Using Jones Matrix Eigenanalysis", IEEE Phot. Tech. Lett., Vol. 4, No. 9, pp 1066–1069, the value of DGD at a particular wavelength for a particular fibre can be derived from measurements of the output states of polarisation (SOPs) that it provides for three given input SOPs, first at a wavelength slightly below the particular wavelength, and then at one slightly above. By repeating these measurements at successive wavelengths over a broad spectral range, it is possible to plot out how the magnitude of the DGD varies as a function of wavelength in this spectral range. These DGD values represent the first order PMD exhibited by that fibre at the wavelengths of measurement.

Since DGD varies with wavelength, and since any data caused to propagate through the fibre will have a certain spectral width, there is a second order PMD effect that contributes to bandwidth limitation, this being determined by the derivative, with respect to optical frequency, of the DGD. This derivative, which is often written as DGD', is typically expressed in units of ps/GHz.

In addition, there is another second order PMD effect associated with changes, also as a function of optical frequency, of launch SOPs that propagate through the fibre to emerge from its far end with single transit times. This derivative, which is often referred to as the principal states rotation component and is written as PSP', is typically expressed in units of radians or degrees of arc per GHz. In the case of a single uniformly birefringent element, there are two specific orthogonal SOPs, known as principal states of polarisation (PSPs) having the property that polarised light launched into either end of the element with its SOP aligned with one of these PSPs will emerge from the far end of the element with the same SOP, having propagated through the element with a single transit time (the transit time value for one PSP being different from that for the other PSP). In the case of light propagating through a concatenation of birefringent elements whose birefringence axes are not all co-aligned, there is similarly a pair of orthogonally related launch SOPs for which polarised light will propagate through the concatenation to emerge form the far end with a single transit time, though in general with a different SOP. By analogy with the single birefringence case, the particular launch SOPs having this property are termed launch principal states of polarisation (LPSPs). These LPSPs can be derived from the earlier described measurements employed for measurement of DGD, in this instance requiring a pair of DGD measurements at adjacent wavelengths. For this purpose the three output SOPs for the three given input SOPs are measured in respect of each of three adjacent wavelengths.

A number of criteria are available for determining how closely, or otherwise, the properties of a particular emulator match those of the long length of installed fibre that the emulator is designed to mimic. One well recognised characteristic of such a fibre (see for instance, G. J. Foschini & C. D. Poole, "Statistical Theory of Polarization Dispersion in Single-Mode Fibers", J. Lightwave Tech., Vol. 9, No. 11, pp 1439–1456) is that if a large number of measurements are made in respect of its first order DGD values at different wavelengths distributed over a broad spectral band, then the statistical spread of those measured values exhibits a substantially Maxwellian distribution. It is also recognised that the phenomenon of PMD in a fibre is an ergodic process, such that the statistics of single DGD samples taken over an ensemble of fibres are equivalent to the time dependent statistics of DGD samples on a single fibre. Furthermore, the statistics of the DGD samples over wavelength can be expected to be equivalent to the statistics of the DGD at a single wavelength over time. These statistics are accepted to be Maxwellian which allows statistical attributes to be derived and used in evaluating the performance of any emulator design. A Maxwellian distribution of values, $\tau$, has the following probability density function:

$$f_\tau(\tau) = \sqrt{\frac{2}{\pi}} \cdot \frac{\tau^2}{\alpha^3} \exp\left[\frac{-\tau^2}{2\alpha^2}\right],$$

where $\alpha$ is a constant which defines the spread of the distribution.

This expression can be used to establish analytically the mean, standard deviation and skewness of the distribution. Analysing the mean and standard deviation of a distribution allows the spread of the distribution to be determined, whilst the skewness identifies whether a distribution is symmetrical or unsymmetrical, and, if unsymmetrical, which way the distribution is skewed. The ratio of the mean to the standard deviation is a constant, as also is the skewness of the distribution, and both can be used as test criteria of the exactness of any one emulator design.

Mean $$\mu = 2\alpha\sqrt{\frac{2}{\pi}}$$

Standard deviation $$\sigma = \alpha\sqrt{3 - \frac{8}{\pi}}$$

Ratio of the mean to standard deviation $$\frac{\sigma}{\mu} = \frac{\alpha\sqrt{3 - \frac{8}{\pi}}}{2\alpha\sqrt{\frac{2}{\pi}}} \approx 0.42$$

Third Central Moment $$\mu_3 = \alpha^3 \sqrt{\frac{2}{\pi}} \cdot \left(\frac{32}{\pi} - 10\right)$$

Skewness $$\gamma_1 = \frac{\mu_3}{\sigma^3} = \frac{\alpha^3\sqrt{\frac{2}{\pi}} \cdot \left(\frac{32}{\pi} - 10\right)}{\left(\alpha^3\left(3 - \frac{8}{\pi}\right)\right)^{\frac{3}{2}}} \approx 0.49$$

The two 'constants' of a Maxwellian distribution, $\sigma/\mu \approx 0.42$ and $\gamma_1 \approx 0.49$, can provide the basis for a testing of the closeness of fit of any given distribution to a Maxwellian distribution. An acceptance region might be defined, for instance, as the test statistic $\pm c.5\%$, i.e.

Test criterion (1)

$$0.4 \leq \frac{\sigma}{\mu} \leq 0.443$$

Test criterion (2)

$$0.44 \leq \gamma_1 \leq 0.54$$

A further way of testing for the closeness of fit between the first order DGD exhibited by an emulator, and that which is expected by fibre installed in the field, can be obtained by looking at the nature of the statistical spread in the distribution of measured first order DGD values. For this purpose a test procedure is employed which takes N random samples of measured DGD values measured at different wavelengths (optical frequencies), and arranges them in a frequency histogram having k bins. Let $O_i$ be the observed frequency in the $i^{th}$ class interval, whilst $E_i$ is the expected frequency in the same class interval from the hypothesised Maxwellian distribution. The test statistic is defined as follows $$R^2 = \sum_{i=1}^{i=k} \frac{(O_i - E_i)^2}{E_i}$$

Once this test statistic has been evaluated, a judgement can be made as to whether or not the first order DGD distribution of the emulator design is sufficiently similar to a real installed fibre. From this has been found empirically that, on the basis of a sample population of 10,000 samples, a suitable further criterion is given by:

Test criterion (3)

$$R^2 \leq 100 \tag{3}$$

Attention is now turned to the statistics of second order DGD effects. In the same way as is the case in respect of the $1^{st}$ order component, both of these $2^{nd}$ order components have probability density functions associated with them, although there is not accepted agreement on the exact form of these distributions. Recent work has emphasised the importance of the role that the higher order aspects of PMD play in the impact on a transmission system, in particular the principal states rotation component. (J M Gleeson et al., 'Experimental and numerical investigation into the penalties induced by second order polarisation mode dispersion at 10 Gb/s', Conference Proceedings, ECOC '97, 1997, Edinburgh, pp 15–18.) The success of any one emulator design will therefore also depend heavily on the ability of the emulator to accurately and realistically emulate higher order PMD. Certain characteristics have been established for the statistics of the principal states rotation, relating the mean of the component to the mean PMD. The probability distribution is also accepted to be more heavily skewed. Based on previous simulation work and measurements of installed fibre, two more test statistics can be put forward. The first is the expected ratio between the mean PSP' (degrees of arc per GHz) component and the mean DGD (ps) component. Empirically, it has been found that:

Ratio of means $$\frac{\langle PSP' \rangle}{\mu} \approx 0.2$$

An acceptance region might be defined, for instance, as the test statistic ±c.10%, i.e.

Test criterion (4)

$$0.18 \leq \frac{\langle PSP' \rangle}{\mu} \leq 0.22 \tag{4}$$

The second test statistic relates to the skewness of the PSP' distribution. Empirically, it has been found that:

PSP' Skewness $$\gamma_1^{PSP'} = \frac{\mu_3^{PSP'}}{\sigma_{PSP'}^3} = \frac{N}{(N-1)(N-2)} \sum_{i=1}^{i=N} \left( \frac{PSP'_i - \langle PSP' \rangle}{\sigma_{PSP'}} \right)^3$$

(where N is the number of samples)
For large N, $$\gamma_1^{PSP'} \approx 2.0$$

The skewness of the PSP' component has a greater variance than the skewness of the DGD component, hence a wider acceptance region might be defined, for instance, as the test statistic ±c. 15%, i.e.

Test criterion (5)

$$1.7 \leq \gamma_1^{PSP'} \leq 2.3 \tag{5}$$

This concludes a set of 5 criteria which together test the ability of a PMD emulator to mimic the PMD characteristics of a typical installed fibre. A particular PMD emulator design can be modelled using Jones matrices to establish whether or not the test criteria are passed, allowing the optimum design to be found before fabricating a physical PMD emulator.

I has been empirically found that there exists substantial correlation between the satisfying of the foregoing set of five test criteria (1) to (5) and the satisfying of the following set of design criteria (i) to (v), comprising:

$$5 \leq n \leq 30 \tag{i}$$

$$0.2 \leq \frac{\tau_{range}}{\langle DGD_{RMS} \rangle} \leq 0.4 \tag{ii}$$

$$\tau_{min} < \tau_{range} \tag{iii}$$

$$\frac{\bar{\tau}}{\langle DGD_{RMS} \rangle} \leq 0.3 \tag{iv}$$

and $$\sigma_\tau < \bar{\tau} \tag{v}$$

Figure 5:
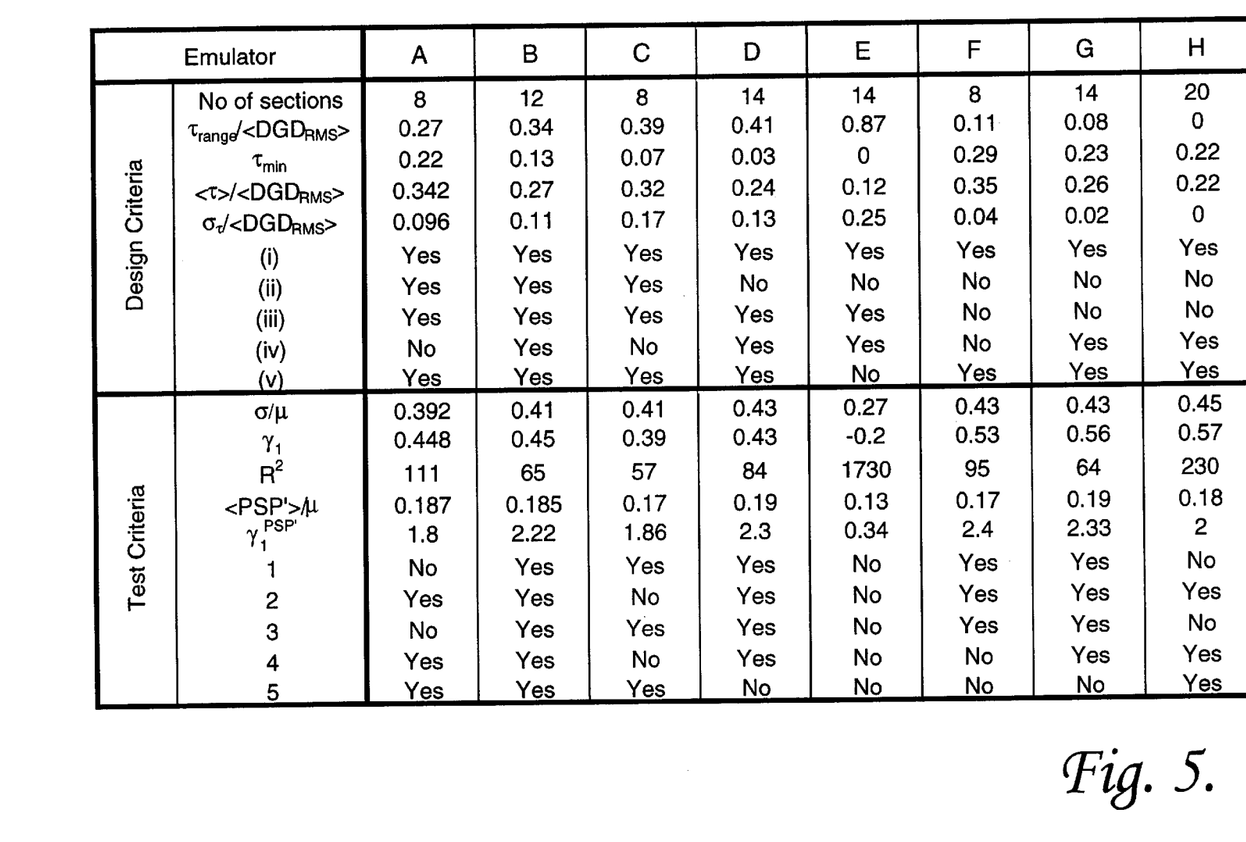
FIG. 5 is a table comparing the performance of different emulators.

FIG. 5 provides, in tabular form, an indication of the relationship between these two sets of criteria based on eight emulators A to H employing a variety of different schemes for selecting their component section length DGD values, τ. Emulators A and B are composed respectively of eight and twelve sections whose DGD values are substantially aligned with members of the series $\tau = q^s$, where q is a constant common to all members of the series, and s is a different integer for each member of the series. Emulators C and D are composed respectively of eight and fourteen sections whose DGD values are substantially aligned in relative proportion to the cardinal numbers 1 to 8 and 1 to 14 respectively. Emulator E is composed of fourteen sections whose DGD values are substantially aligned in relative proportion to the members of the power series 2 to $2^{14}$. Emulators F and G are composed respectively of eight and twelve sections whose DGD values are substantially aligned in relative proportion to lie at randomly chosen points on a Gaussian distribution curve having a standard deviation of 0.1. Emulator H is composed of twenty sections, all of substantially the same length.

Figure 6:
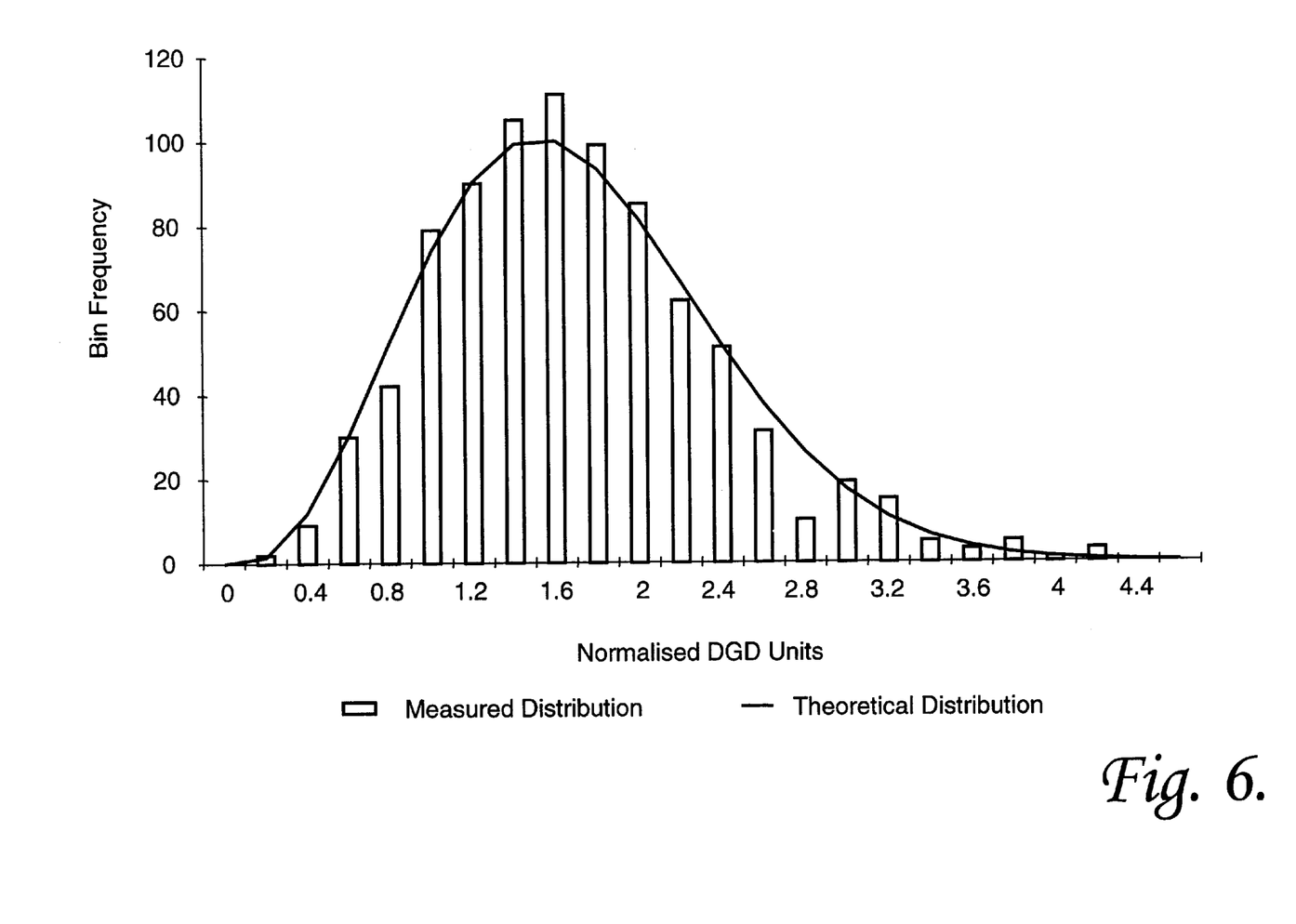
FIGS. 6, 7 and 8 are histograms of measured DGD values.
Figure 7:
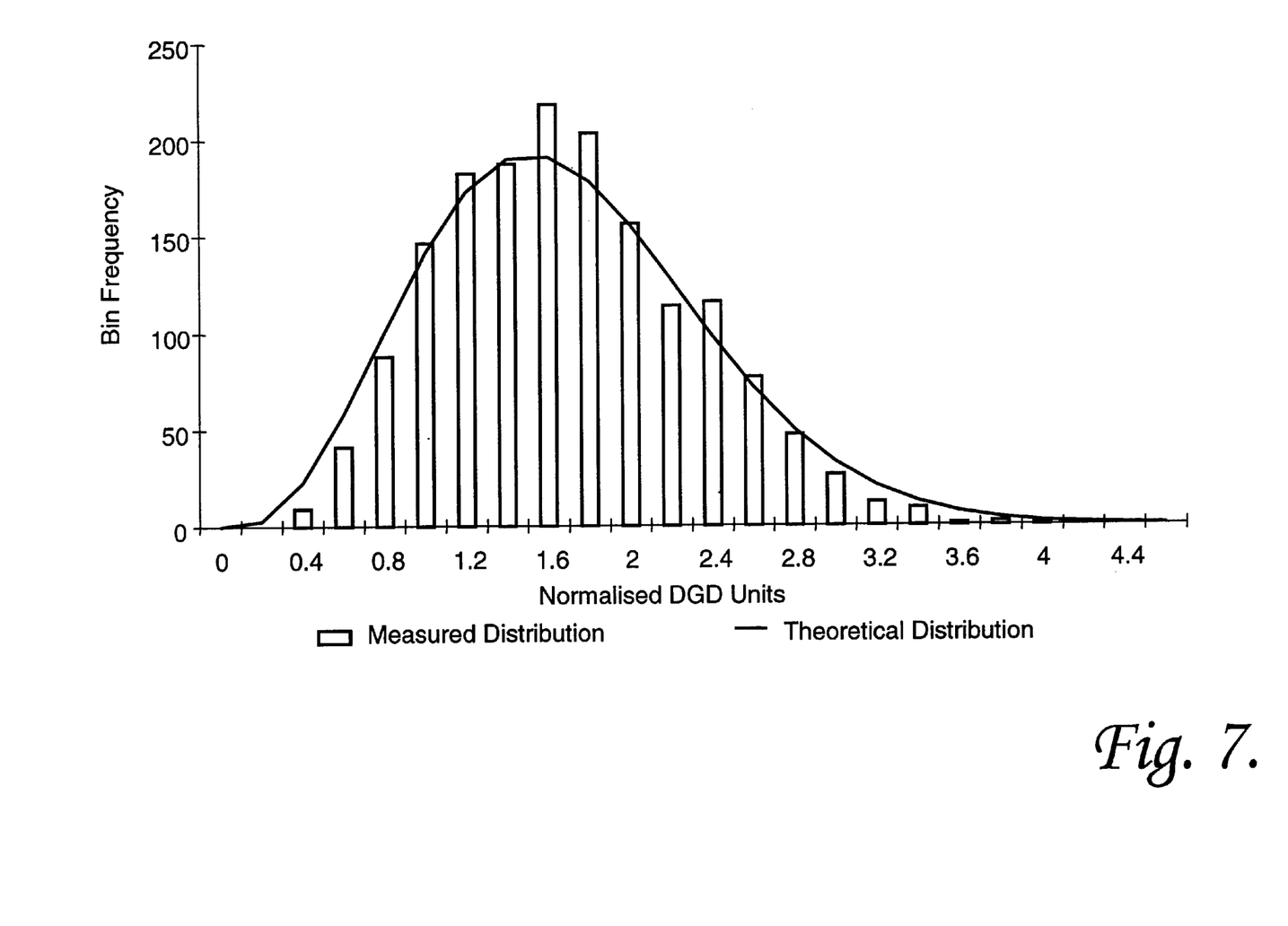
Figure 8:
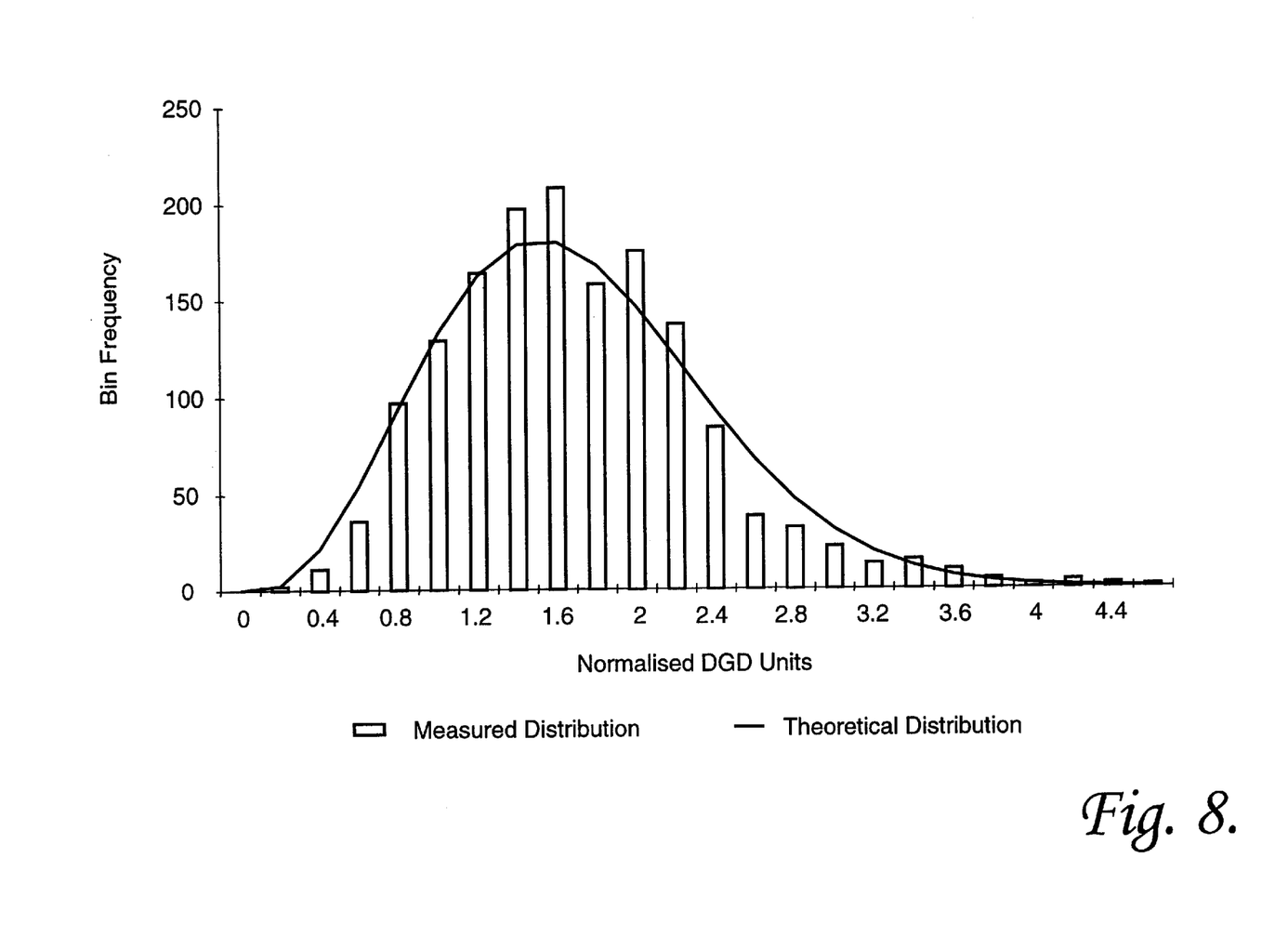

Results of DGD test measurements performed on emulator B are depicted in FIGS. 6 and 7. FIG. 6 depicts the occurrence frequency histogram of DGD measured values measured at different optical frequencies, while FIG. 7 depicts a corresponding histogram in respect of DGD measured values measured at a single frequency over a period of 60 hours. For purposes of comparison, FIG. 8 depicts a histogram corresponding to that of FIG. 6, but in respect of a length of optical fibre (exceeding 200 km) actually installed in the field. Each of FIGS. 6,7 and 8 additionally includes the theoretical Maxwellian distribution curve. In each case, the difference between the histogram and the theoretical curve is attributable at least in part to the relatively small number (N<<10,000) of sample measurements.

In addition to the requirement that the design of the PMD emulator must satisfactorily mimic the PMD of an installed fibre, there are other desirable features of a design. In order to have a high level of confidence that any one design will provide robust and repeatable PMD characteristics, it is desirable that the design be completely deterministic. A design which incorporates some amount of random choice (such as is involved in the emulators F and G above) will inevitably reduce the level of confidence one can have in its PMD characteristics being repeatable, such as the design suggested in C H Prola, Jr. et al. in, 'PMD Emulators and Signal Distortion in 2.48 Gb/s UM-DD Lightwave Systems'. When one considers the aspects of fabricating an actual PMD emulator certain issues become apparent. Fabrication time and cost, increases with the number of constituent elements which make up the PMD emulator, which is one reason why it is extremely desirable to provide a design which uses as few elements as possible. If the emulator was to be produced through a combination of fibre elements, connectorised and connected together, then the losses of each connection would limit the total number of elements which could be used. Typically this might be around 16 elements with a total insertion loss through the emulator of around 18 dB. It is clear that the closeness with which a PMD emulator will, in general, mimic the PMD characteristics of an installed fibre increases as the number of constituent elements increases. This means that a balance has to be drawn between enough elements to provide good emulation, and not so many elements as to cause unacceptably large insertion losses or high fabrication costs. This in turn implies that any design which is both deterministic and attains satisfactory emulation for the fewest number of elements would be the optimum choice.

What is claimed:

1. A method of emulating the first and second order PMD (polarisation mode dispersion) properties of a length of low birefringence optical fibre installed in the field, in which method light is caused to propagate through a concatenation of n lengths of high birefringence optical waveguide, each having two guided modes, respectively a fast mode and a slow mode, and each length presenting a different value of differential group delay, $\tau_r$, for light propagating in those modes, where r is a positive integer between 1 and n, wherein the $r^{th}$ length of the concatenation is optically coupled with the $(r+1)^{th}$ length in a manner providing cross coupling of the modes so that only $\cos^2 \theta_r$ of the power propagating in each mode (fast or slow) of the $r^{th}$ length is launched into the same mode (fast or slow) of the $(r+1)^{th}$ length while the remaining $\sin^2 \theta_r$ of the power is launched into the opposite mode (slow or fast), wherein the values of $\theta_r$ for r=1 to r=(n−1) have a substantially random distribution within the range 0 to $\pi/2$, and wherein said lengths and their differential group delays satisfy the following five criteria (i) to (v):

$$5 \leq n \leq 30 \quad \text{(i)}$$

$$0.2 \leq \frac{\tau_{range}}{\langle DGD_{RMS} \rangle} \leq 0.4 \quad \text{(ii)}$$

$$\tau_{min} < \tau_{range} \quad \text{(iii)}$$

$$\frac{\bar{\tau}}{\langle DGD_{RMS} \rangle} \leq 0.3 \quad \text{(iv)}$$

and $$\sigma_\tau < \bar{\tau} \quad \text{(v)}$$

where the expected root mean square DGD (differential group delay) of the concatenation is $$\sqrt{\sum_{r=1}^{r=n} \tau_r^2} = \langle DGD_{RMS} \rangle,$$

the mean DGD of the lengths is $$\frac{\sum_{r=1}^{r=n} \tau_r}{n} = \bar{\tau},$$

the DGD values of the lengths respectively with the maximum and minimum DGDs are $\tau_{max}$ and $\tau_{min}$, the range of DGD values is $\tau_{range} = \tau_{max} - \tau_{min}$, and the standard deviation of the DGD values is $\sigma_\tau$.

2. A method as claimed in claim 1, wherein temporal fluctuations in DGD produced by the concatenation are artificially accelerated by thermal exploration.

3. A method as claimed in claim 1, wherein the concatenation is constituted by a single continuous piece of high birefringence fibre formed into said concatenation of lengths by a set of (n−1) localised mode cross-coupling inducing transducers.

4. A method as claimed in claim 1, wherein the concatenation is constituted by a set of n pieces of high birefringence fibre formed into said concatenation of lengths by a set of (n−1) single mode optical fibre patch cords.

5. A method as claimed in claim 1, wherein the concatenation is constituted by a set of n pieces of high birefringence fibre formed into said concatenation of lengths by a set of (n−1) optical fibre splices.

6. A method of emulating the first and second order PMD (polarisation mode dispersion) properties of a length of low birefringence optical fibre installed in the field, in which method light is caused to propagate through a concatenation of n lengths of high birefringence optical waveguide, wherein $5 \leq n \leq 30$, each having two guided modes, respectively a fast mode and a slow mode, and each presenting a different value of differential group delay, $\tau$, for light propagating in those two modes, wherein the $r^{th}$ length of the concatenation, where r is a positive integer between 1 and n, is optically coupled with the $(r+1)^{th}$ length in a manner providing cross coupling of the modes so that only $\cos^2 \theta_r$ of the power propagating in each mode (fast or slow) of the $r^{th}$ length is launched into the same mode (fast or slow) of the $(r+1)^{th}$ length while the remaining $\sin^2 \theta_r$ of the power is launched into the opposite mode (slow or fast), wherein the values of $\theta_r$ for r=1 to r=(n−1) have a substantially random distribution within the range 0 to $\pi/2$, wherein said differential group delay values are substantially aligned with members of the series $\tau = q^s$, where q is a constant common to all members of the series, and s is a different integer for each member of the series.

7. A method as claimed in claim 6, wherein temporal fluctuations in DGD produced by the concatenation are artificially accelerated by thermal exploration.

8. A method as claimed in claim 6, wherein the concatenation is constituted by a single continuous piece of high birefringence fibre formed into said concatenation of lengths by a set of (n−1) localised mode cross-coupling inducing transducers.

9. A method as claimed in claim 6, wherein the concatenation is constituted by a set of n pieces of high birefringence fibre formed into said concatenation of lengths by a set of (n−1) single mode optical fibre patch cords.

10. A method as claimed in claim 6, wherein the concatenation is constituted by a set of n pieces of high birefringence fibre formed into said concatenation of lengths by a set of (n−1) optical fibre splices.

11. A method of emulating the first and second order PMD (polarisation mode dispersion) properties of a length of low birefringence optical fibre installed in the field, in which method light is caused to propagate through a concatenation of n lengths of high birefringence fibre, each presenting a different value of differential group delay, $\tau_r$, where r is a positive integer between 1 and n, and each connected with its adjacent lengths in the concatenation with birefringence axes unaligned relative orientation, wherein said lengths satisfy the following five criteria (i) to (v):

$$5 \leq n \leq 30 \qquad (i)$$

$$0.2 \leq \frac{\tau_{range}}{\langle DGD_{RMS} \rangle} \leq 0.4 \qquad (ii)$$

$$\tau_{min} < \tau_{range} \qquad (iii)$$

$$\frac{\bar{\tau}}{\langle DGD_{RMS} \rangle} \leq 0.3 \qquad (iv)$$

and $$\sigma_\tau < \bar{\tau} \qquad (v)$$

where the expected root mean square DGD (differential group delay) of the concatenation is $$\sqrt{\sum_{r=1}^{r=n} \tau_r^2} = \langle DGD_{RMS} \rangle,$$

the mean DGD of the lengths is $$\frac{\sum_{r=1}^{r=n} \tau_r}{n} = \bar{\tau},$$

the DGD values of the lengths respectively with the maximum and minimum DGDs are $\tau_{max}$ and $\tau_{min}$, the range of DGD values is $\tau_{range} = \tau_{max} - \tau_{min}$, and the standard deviation of the DGD values is $\sigma_\tau$.

12. A method as claimed in claim 11, wherein temporal fluctuations in DGD produced by the concatenation are artificially accelerated by thermal exploration.

13. A method of emulating the first and second order PMD (polarisation mode dispersion) properties of a length of low birefringence optical fibre installed in the field, in which method light is caused to propagate through a concatenation of n lengths of high birefringence optical waveguide, wherein $5 \leq n \leq 30$, each presenting a different value of differential group delay, $\tau$, and each connected with its adjacent lengths in the concatenation with birefringence axes unaligned substantially random relative orientation, wherein said differential group delay values are substantially aligned with members of the series $\tau = q^s$, where q is a constant common to all members of the series, and s is a different integer for each member of the series.

14. An emulator for emulating the first and second order PMD (polarisation mode dispersion) properties of a length of low birefringence optical fibre installed in the field, the emulator including a concatenation of n lengths of high birefringence optical waveguide through which light is caused to propagate, each length having two guided modes, respectively a fast mode and a slow mode, and each presenting a different value of differential group delay, $\tau_r$, for light propagating in those modes, where r is a positive integer between 1 and n, wherein the $r^{th}$ length of the concatenation is optically coupled with the $(r+1)^{th}$ length in a manner providing cross coupling of the modes so that only $\cos^2 \theta_r$ of the power propagating in each mode (fast or slow) of the $r^{th}$ length is launched into the same mode (fast or slow) of the $(r+1)^{th}$ length while the remaining $\sin^2 \theta_r$ of the power is launched into the opposite mode (slow or fast), wherein the values of $\theta_r$ for r=1 to r=(n−1) have a substantially random distribution within the range 0 to $\pi/2$, and wherein said lengths and their differential group delays satisfy the following five criteria (i) to (v):

$$5 \leq n \leq 30 \qquad (i)$$

$$0.2 \leq \frac{\tau_{range}}{\langle DGD_{RMS} \rangle} \leq 0.4 \qquad (ii)$$

$$\tau_{min} < \tau_{range} \qquad (iii)$$

$$\frac{\bar{\tau}}{\langle DGD_{RMS} \rangle} \leq 0.3 \qquad (iv)$$

and $$\sigma_\tau < \bar{\tau} \qquad (v)$$

where the expected root mean square DGD (differential group delay) of the concatenation is $$\sqrt{\sum_{r=1}^{r=n} \tau_r^2} = \langle DGD_{RMS} \rangle,$$

the mean DGD of the lengths is $$\frac{\sum_{r=1}^{r=n} \tau_r}{n} = \bar{\tau},$$

the DGD values of the lengths respectively with the maximum and minimum DGDs are $\tau_{max}$ and $\tau_{min}$, the range of DGD values is $\tau_{range} = \tau_{max} - \tau_{min}$, and the standard deviation of the DGD values is $\sigma_\tau$.

15. An emulator as claimed in claim 14, and additionally including a heater adapted to produce accelerated DGD exploration by the inducing of a time-varying thermal field distribution in the concatenation.

16. An emulator as claimed in claim 14, wherein the concatenation is constituted by a single continuous piece of high birefringence fibre formed into said concatenation of lengths by a set of (n−1) localised mode cross-coupling inducing transducers.

17. An emulator as claimed in claim 14, wherein the concatenation is constituted by a set of n pieces of high birefringence fibre formed into said concatenation of lengths by a set of (n−1) single mode optical fibre patch cords.

18. An emulator as claimed in claim 14, wherein the concatenation is constituted by a set of n pieces of high birefringence fibre formed into said concatenation of lengths by a set of (n−1) optical fibre splices.

19. An emulator for emulating the first and second order PMD (polarisation mode dispersion) properties of a length of low birefringence optical fibre installed in the field, the emulator including a concatenation of n lengths of high birefringence optical waveguide through which light is caused to propagate, wherein $5 \leq n \leq 30$, each having two guided modes, respectively a fast mode and a slow mode, and each presenting a different value of differential group delay, $\tau$, for light propagating in those two modes, wherein the $r^{th}$ length of the concatenation, where r is a positive integer between 1 and n, is optically coupled with the $(r+1)^{th}$ length in a manner providing cross coupling of the modes so that only $\cos^2 \theta_r$ of the power propagating in each mode (fast or slow) of the $r^{th}$ length is launched into the same mode (fast or slow) of the $(r+1)^{th}$ length while the remaining $\sin^2 \theta_r$ of the power is launched into the opposite mode (slow or fast), wherein the values of $\theta_r$ for r=1 to r=(n−1) have a substantially random distribution within the range 0 to $\pi/2$, wherein said differential group delay values are substantially aligned with members of the series $\tau = q^s$, where q is a constant common to all members of the series, and s is a different integer for each member of the series.

20. An emulator as claimed in claim 19, and additionally including a heater adapted to produce accelerated DGD exploration by the inducing of a time-varying thermal field distribution in the concatenation.

21. An emulator as claimed in claim 19, wherein the concatenation is constituted by a single continuous piece of high birefringence fibre formed into said concatenation of lengths by a set of (n−1) localised mode cross-coupling inducing transducers.

22. An emulator as claimed in claim 19, wherein the concatenation is constituted by a set of n pieces of high birefringence fibre formed into said concatenation of lengths by a set of (n−1) single mode optical fibre patch cords.

23. An emulator as claimed in claim 19, wherein the concatenation is constituted by a set of n pieces of high birefringence fibre formed into said concatenation of lengths by a set of (n−1) optical fibre splices.

24. An emulator for emulating the first and second order PMD (polarisation mode dispersion) properties of a length of low birefringence optical fibre installed in the field, the emulator including a concatenation of n lengths of high birefringence fibre through which light is caused to propagate, each length presenting a different value of differential group delay, $\tau_r$, where r is a positive integer between 1 and n, and each connected with its adjacent lengths in the concatenation with birefringence axes unaligned relative orientation, wherein said lengths satisfy the following five criteria (i) to (v):

$$5 \leq n \leq 30 \quad \text{(i)}$$

$$0.2 \leq \frac{\tau_{range}}{\langle DGD_{RMS} \rangle} \leq 0.4 \quad \text{(ii)}$$

$$\tau_{min} < \tau_{range} \quad \text{(iii)}$$

$$\frac{\bar{\tau}}{\langle DGD_{RMS} \rangle} \leq 0.3 \quad \text{(iv)}$$

and $$\sigma_\tau < \bar{\tau} \quad \text{(v)}$$

where the expected root mean square DGD (differential group delay) of the concatenation is $$\sqrt{\sum_{r=1}^{r=n} \tau_r^2} = \langle DGD_{RMS} \rangle,$$

the mean DGD of the lengths is $$\frac{\sum_{r=1}^{r=n} \tau_r}{n} = \bar{\tau},$$

the DGD values of the lengths respectively with the maximum and minimum DGDs are $\tau_{max}$ and $\tau_{min}$, the range of DGD values is $\tau_{range} = \tau_{max} - \tau_{min}$, and the standard deviation of the DGD values is $\sigma_\tau$.

25. An emulator as claimed in claim 24, and additionally including a heater adapted to produce accelerated DGD exploration by the inducing of a time-varying thermal field distribution in the concatenation.

26. An emulator for emulating the first and second order PMD (polarisation mode dispersion) properties of a length of low birefringence optical fibre installed in the field, the emulator including a concatenation of n lengths of high birefringence optical waveguide through which light is caused to propagate, wherein $5 \leq n \leq 30$, each length presenting a different value of differential group delay, $\tau$, and each connected with its adjacent lengths in the concatenation with birefringence axes unaligned substantially random relative orientation, wherein said differential group delay values are substantially aligned with members of the series $\tau = q^s$, where q is a constant common to all members of the series, and s is a different integer for each member of the series.

* * * * *